(12) United States Patent
Vacanti

(10) Patent No.: US 7,161,527 B2
(45) Date of Patent: Jan. 9, 2007

(54) NAVIGATION SYSTEM

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 129 days.

(21) Appl. No.: 11/018,886

(22) Filed: Dec. 21, 2004

(65) Prior Publication Data

US 2006/0049977 A1   Mar. 9, 2006

Related U.S. Application Data

(60) Provisional application No. 60/607,476, filed on Sep. 3, 2004.

(51) Int. Cl.
*G01S 13/08* (2006.01)

(52) U.S. Cl. ...................................... 342/121; 342/122

(58) Field of Classification Search ................ 342/120, 342/121, 122
See application file for complete search history.

(56) References Cited

U.S. PATENT DOCUMENTS

| | | | |
|---|---|---|---|
| 5,714,948 A * | 2/1998 | Farmakis et al. | 342/29 |
| 6,426,717 B1 | 7/2002 | Maloratsky | |
| 2003/0093187 A1* | 5/2003 | Walker | 701/1 |
| 2006/0049977 A1* | 3/2006 | Vacanti | 342/121 |

* cited by examiner

*Primary Examiner*—Dan Pihulic
(74) *Attorney, Agent, or Firm*—Black Lowe & Graham PLLC

(57) ABSTRACT

A radar altimeter system with a closed-loop modulation for generating more accurate radar altimeter values. The present invention combines flight safety critical sensors into a common platform to permit autonomous or semi-autonomous landing, enroute navigation and complex precision approaches in all weather conditions. An Inertial Navigation System (INS) circuit board, a radar altimeter circuit board and a Global Navigation Satellite System (GNSS) circuit board are housed in a single chassis. VHF (Very High Frequency) Omni-directional Radio (VOR), Marker Beacon (MB), and VDB (VHF Data Broadcast) receiver circuit boards may also be implemented on circuit boards in the chassis.

8 Claims, 10 Drawing Sheets

*FIG. 1* *(PRIOR ART)*

NAVIGATION SYSTEM

PRIORITY CLAIM

This application claims priority from U.S. Provisional Application Ser. No. 60/607,476, filed Sep. 3, 2004, which is hereby incorporated by reference.

BACKGROUND OF THE INVENTION

Typical aircraft radar altimeters include separate reception and transmission antennas located on the bottom of the fuselage of commercial or private aircraft. Separate transmit and receive antennas have historically been used in order to provide isolation between the transmitter and receiver during continuous transmission and reception of a radar signal. Transmitter to receiver isolation was required due to technology shortcomings of microwave signal sources and microwave device packaging technology. Similarly, microwave sources used in present radar altimeters used open loop methods.

Operation of existing radar altimeters relies on a reflection of the transmitting antenna signal from the ground to the receiving antenna. At high altitudes, the separation distance between transmit and receive antennas results in a small reflection angle between the transmitted and received signals and provides excellent signal reception. At much lower altitudes, such as during a landing; the reflection angle between the transmitting and receiving antennas becomes very large, thus attenuating signal reception at the outer reaches of the antenna beamwidths. When the aircraft is below a low altitude threshold, the reflection angle will exceed the beamwidth of the transmitting or receiving antennas and altimeter operation will cease. Therefore, at low altitudes the separation distance between the two antennas of conventional radar altimeters reduces the received signal strength compromising signal-to-noise ratio and thus reduces altitude accuracy. Moreover, conventional dual antenna altimeters may erroneously acquire reflections from aircraft components such as engines and wheel gear instead of the correct ground reflection. When at low altitudes, a single antenna radar altimeter uses a single vertical reflection path to and from the ground not impacted by altitude or attitude of the aircraft. In special applications such as an aircraft tail-strike protection system, there is a requirement to measure distances to the ground of less than one foot. Hence, a dual antenna altimeter will not function in such applications. Therefore, there are many needs for a single antenna FM radar altimeter.

The U.S. Pat. No. 6,426,717 to Maloratski presents a single antenna FM radar altimeter that performs continuous wave (FM/CW) modulation as well as an interrupted continuous wave modulation. FIG. 1 illustrates Maloratski's radar altimeter and FIG. 2 illustrates phase noise produced by a comparable system. Maloratski includes a circulator that directs transmission signals to the antenna or directs received signals through a radar-processing portion. Maloratski connects the circulator to the antenna via a coax cable, as it is the intent of the patent to remotely locate the radio frequency generation components of the altimeter from the antenna. Precision low range altimeter applications require exceptionally stable altitude data. However, temperature and moisture may affect coax cables by increasing cable insertion loss, increasing reflection coefficients and changes in propagation delay times. Therefore, no means presently exist to continuously calibrate the true electrical length of the connecting cable. Any radar altimeter connected to its antenna or antennas via coax must calibrate propagation delay in order to determine a fixed distance to and from the transmitting and receiving antenna(s) caused by the electrical length of the coax for each aircraft installation.

Maloratski also presents closed-loop analog circuitry for continuously adjusting modulation rate to produce a constant frequency received signal but the loop does not control the linearity or phase noise of the radar modulation. Any frequency modulated radar altimeter relies upon a nearly ideal linear modulation function of frequency change versus time. Maloratski's closed-loop analog circuitry provides no means to verify that the modulation function is nearly ideally linear as a function of time, temperature or other environmental effects because it controls the frequency of the received signal only. In this way, Maloratski's approach uses an open loop modulation system.

Radio frequency sources of many types are subject to Frequency Pulling as a function of load impedance. As a result, open loop modulation systems suffer distortion in the linearity of the frequency modulation function due to a varying Voltage Standing Wave Ratio (VSWR) caused by coax cable deterioration and/or poor antenna matching. Poor modulation linearity results in degraded signal to noise ratio, altitude accuracy and causes errors in measurements of modulation rate.

Many conventional radar altimeters, including the single antenna altimeter proposed by Maloratski, continuously adjust the period of the linear frequency modulation waveform as a function of altitude in order to achieve a constant received difference frequency. This constant received difference frequency is key to the altitude tracking mechanism of Maloratski and most known radar altimeters. While this design feature provides a means to facilitate analog altitude tracking subsystems, it forces the altimeter to additionally provide an automatic gain control (AGC) circuit that adjusts the amplitude of the received signal as a function of altitude and reflection brightness from the ground. This design feature complicates the altimeter design and imposes limitations to the response time of the overall altimeter circuitry with rapidly varying ground heights.

A basic concern for Frequency Modulated/Continuous Wave (FM/CW) radars with a single antenna is a large signal reflection from its antenna or connecting coax. Large amplitude reflections from the antenna or connecting coax cause the continuously transmitting radar to jam itself, thereby limiting sensitivity. Maloratski and others have utilized specialized cancellation circuitry in an attempt to prevent FM/CW self-jamming.

Therefore, present single antenna radar altimeter systems, like Maloratski, are overly complex, utilize open loop modulation and are relatively imprecise because of time and temperature changes and degraded RF performance due to coax cable degradation over time.

Typically, all radar altimeters are located mid-ship on an aircraft in relatively close proximity to the antenna installations, in order to minimize coax losses at 4.3 GHz. Current radar altimeters have not been physically combined with any other navigation radio components. Consequently, the remotely located radar altimeter incurs a weight penalty because an extra box is needed and because many feet of heavy coax cable is used.

Therefore, there exists a need to reduce the weight of electronics on an aircraft while improving data analysis.

Multi-Mode Radio (MMR) systems have combined various navigation components, such as ILS, INS, GPS (GNSS), and other radios. Their use is limited to the data from one system backing up or verifying the data from another system. For example, when using INS data for an approach to landing, differentially corrected GPS data constantly corrects for INS data drift. If there is a loss of GPS data or GPS integrity falls below an acceptable value (due to satellite acquisition problems), INS data may only be used for short period.

Therefore, there exists a need to provide greater integrity of INS and GPS data for use in various navigation scenarios.

SUMMARY OF THE INVENTION

The present invention provides a system that physically combines the radar altimeter signal processing components with other navigation sensors while remotely locating the radio frequency portion at the antenna. The present invention combines flight safety critical sensors into a common platform to permit autonomous or semi-autonomous landing, enroute navigation and complex precision approaches in all weather conditions.

Inertial Navigation System (INS) circuitry that may include an inertial sensor, radar altimeter circuitry and Global Navigation Satellite System (GNSS) circuitry are housed in a single chassis. VHF (Very High Frequency) Omni-directional Radio (VOR), Marker Beacon (MB), MLS (Microwave Landing System), and VDB (VHF Data Broadcast) receiver circuitry may also be included in the chassis. Various technologies such as MEMS filters may permit dense packaging of all of these receiver functions onto as little as a single circuit board.

Weight and installation costs can be reduced by combining these functions into a single chassis with a single antenna radar altimeter. Other functions such as Doppler beam sharpening can occur because of the phase coherency of the modulated radar signal.

BRIEF DESCRIPTION OF THE DRAWINGS

The preferred and alternative embodiments of the present invention are described in detail below with reference to the following drawings.

DETAILED DESCRIPTION OF THE INVENTION

Figure 3:
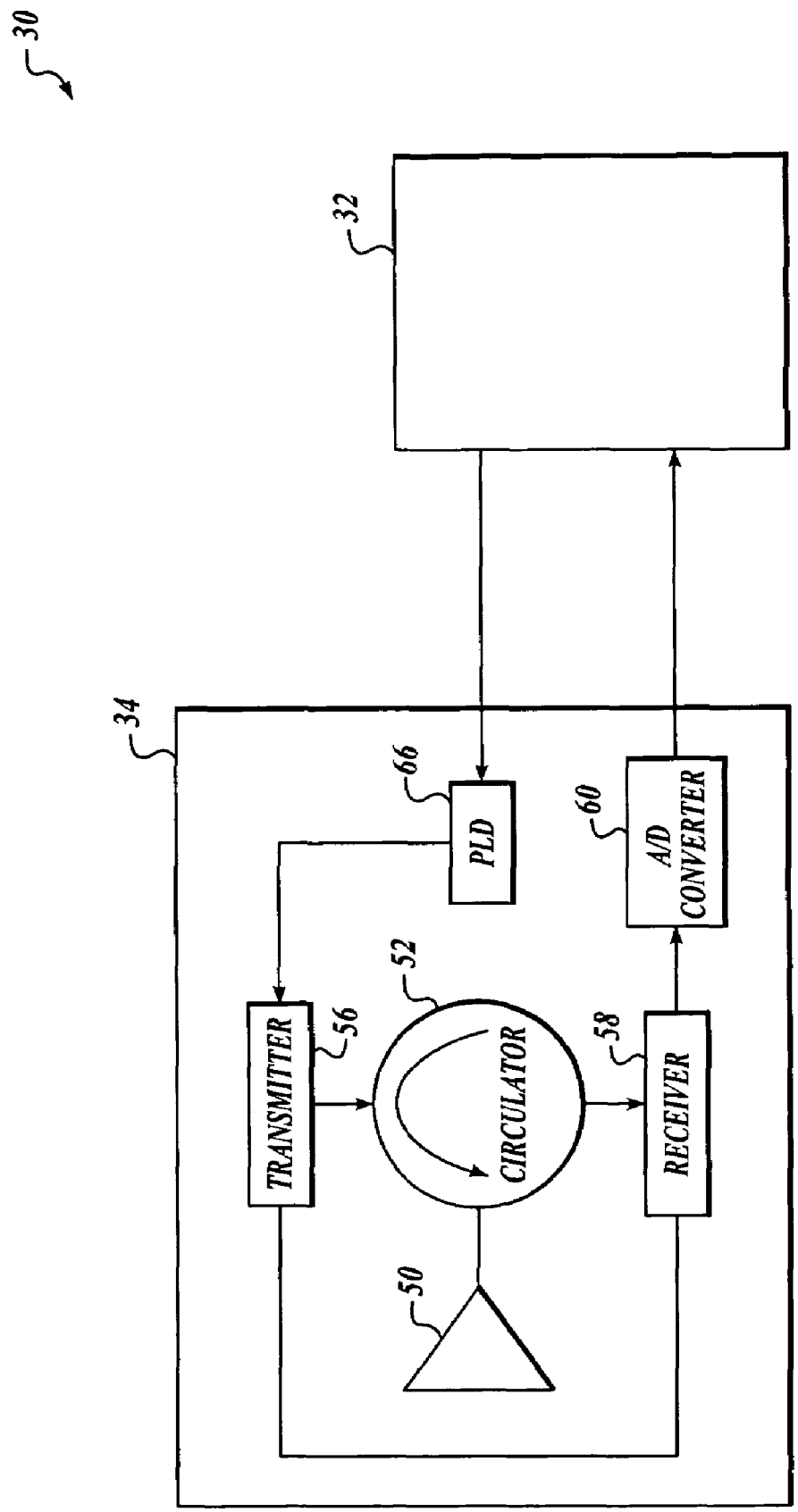
FIG. 3 illustrates a block diagram of a radar altimeter and tail strike warning system formed in accordance with an embodiment of the present invention.

FIG. 3 illustrates an example system 30 that includes a radar altimeter 34 and a navigation radio unit 32. The navigation radio unit 32 will be described in more detail below. The radar altimeter 34 produces a digital signal composed of frequencies that correspond to radar reflections at various altitudes. The produced digital signal is transmitted using an error detection/correction scheme to the navigation radio unit 32 over an Ethernet link, fiber optic cables, or another link that provides comparable high digital data bandwidth capabilities.

The radar altimeter 34 includes a single antenna 50 coupled to a circulator 52. The circulator 52 is a conventional circulator commercially available to provide coupling of a transmitter 56 and a receiver 58 to the antenna 50, while providing isolation between the transmitter 56 and the receiver 58. The transmitter 56 is in signal communication with a Programmable Logic Device 66. The receiver 58 is in communication with the A/D Converter 60.

Figure 4:
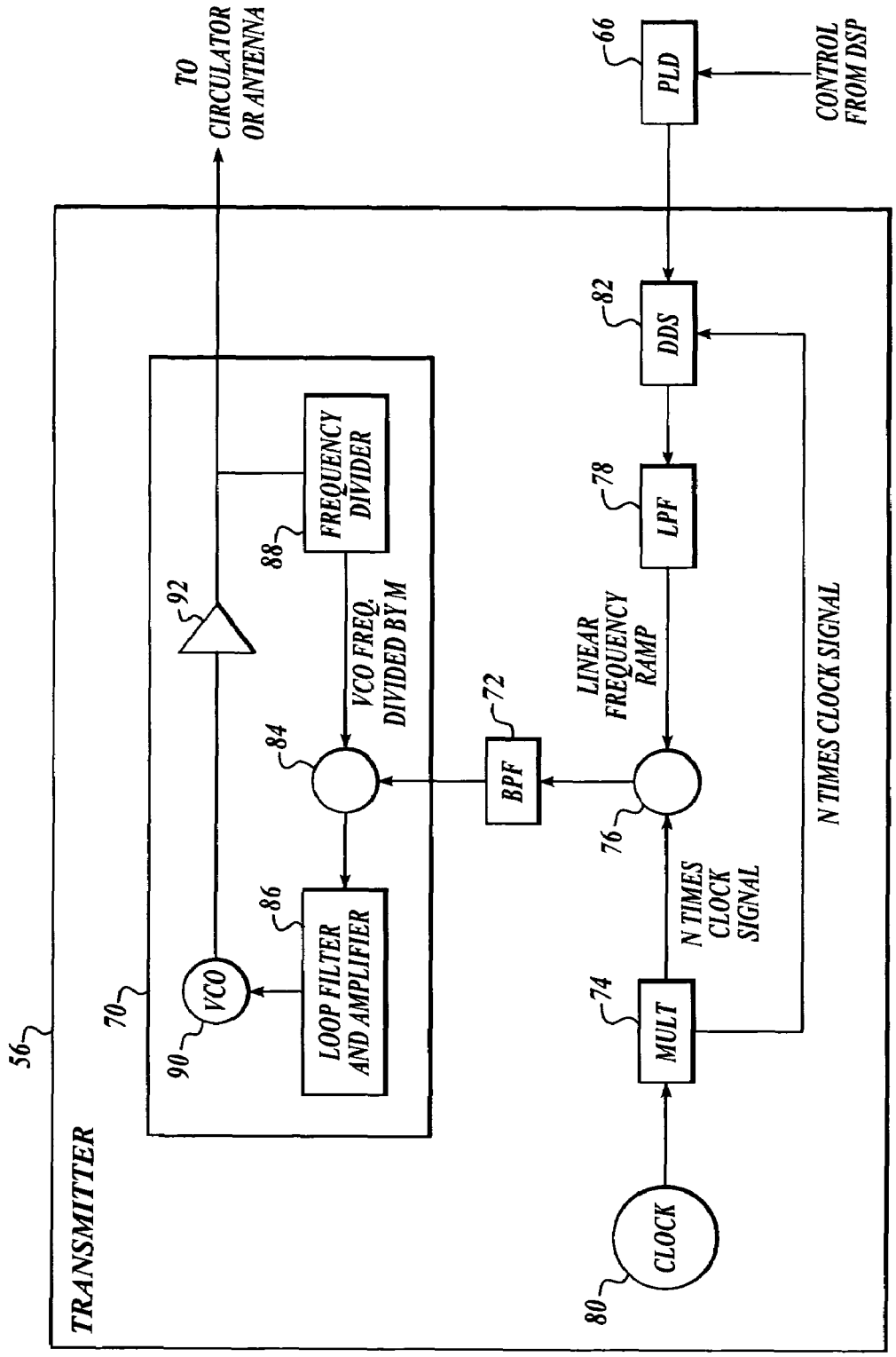
FIG. 4 illustrates components of a transmitter included within the system shown in FIG. 3.

FIG. 4 illustrates components of the transmitter 56. The transmitter 56 includes closed-loop circuit 70, such as a phase-locked loop (PLL) circuit. In one embodiment, the circuit 70 includes a voltage-controlled oscillator (VCO) 90 that generates an output radar signal and a frequency divider 88 that scales the output of the VCO 90 from a microwave or millimeterwave frequency to a high VHF or UHF frequency. A phase/frequency comparator 84 compares the output of the frequency divider 88 with a reference signal generated by a direct digital synthesizer (DDS) 82, a low pass filter (LPF) 78, a band pass filter (BPF) 72, a mixer 76, and a frequency multiplier 74 and adjusts the output frequency of the VCO 90 such that it follows the frequency and phase of the digitally synthesized reference signal. The frequency multiplier 74, mixer 76 and filters 72 and 78 are used to translate the linear frequency ramp of the DDS 82 up to UHF frequencies where it is compared directly with the UHF frequency output of the frequency divider 88 in a phase/frequency comparator 84. A loop filter and amplifier 86 generates a tuning control signal for the VCO 90 based on the comparison done at the comparator 84. The closed-loop modulation of the VCO 90 and amplifier 92 flows to the circulator 52 for output through the antenna 50.

Figure 5A:
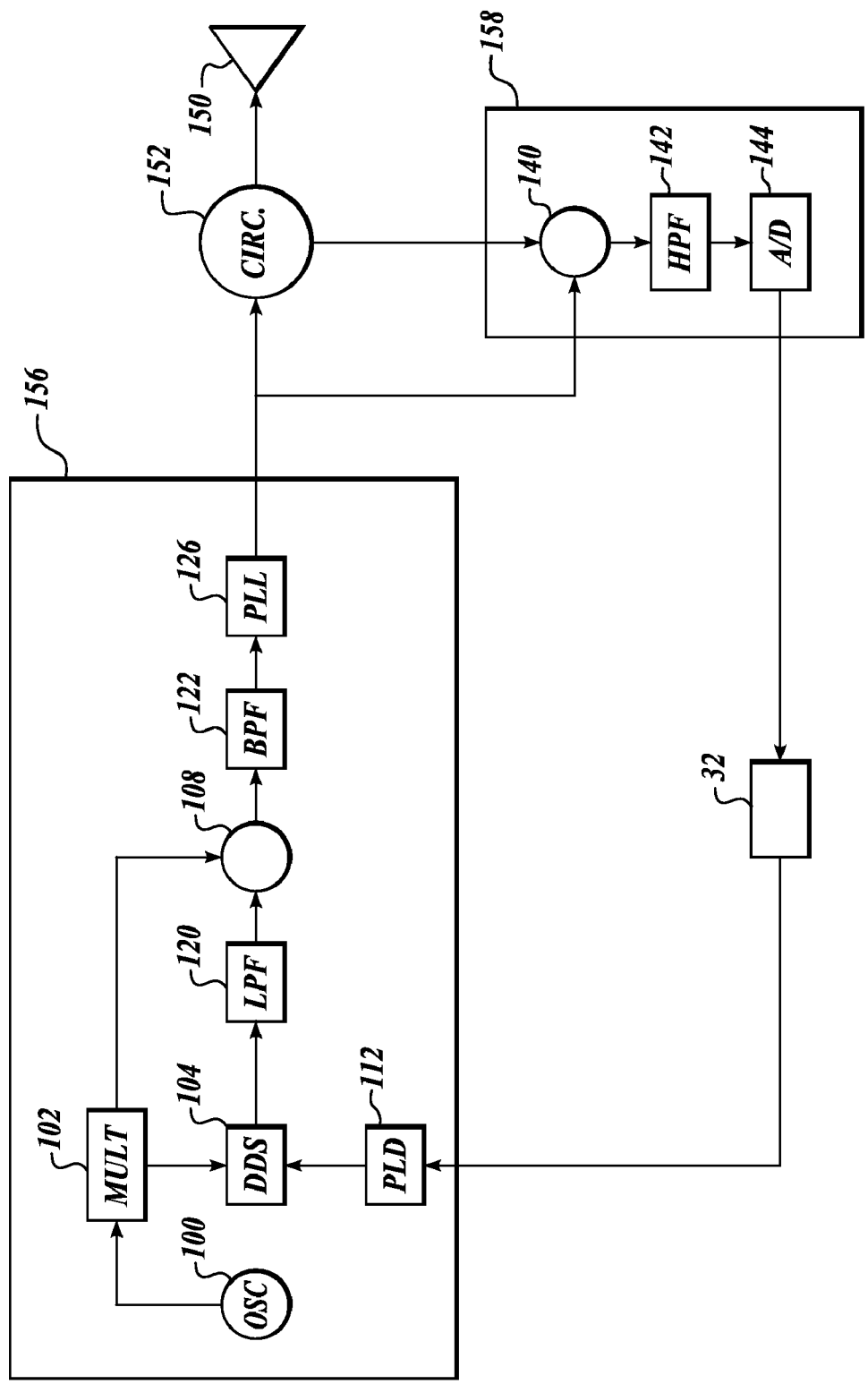
FIG. 5A illustrates detailed electronic components of a radar altimeter formed in accordance with an embodiment of the present invention.

FIG. 5A illustrates a single antenna embodiment of a radar altimeter A transmitter 156 includes a first oscillator 100 for producing a clock signal. A frequency multiplication circuit 102 raises the clock signal frequency by a factor N such that it is sufficiently high to operate a direct digital synthesizer 104 and offset the output of the synthesizer 104 to the UHF band when the two are combined in a mixer 108 and filtered by bandpass filter 122. The navigation radio unit 32, located in the electronics bay, sends a control signal to a programmable logic device (PLD) 112 that converts the control signal into DDS commands that translate into a linear frequency modulation of a particular bandwidth and period or a calibration or self-test process. The DDS 104 generates a high quality linear FM ramp by generating precise and discrete sinusoidal amplitude samples at a rate of the clock frequency signal generated by the multiplication circuit 102. The discrete sinusoidal amplitude samples that comprise the linear FM ramp produced by the DDS 104 pass through low pass filter (LPF) 120 where the output becomes a continuous analog signal at VHF frequencies. The continuous linear frequency modulation is added to the output of the frequency multiplication circuit 102 at mixer 108. The output of the mixer 108 is band limited by band pass filter (BPF)

122 and becomes a UHF reference signal at the input of a phase and frequency comparator not shown) of a phase-locked loop (PLL) circuit 126, similar to circuit 70 (FIG. 4). The phase and frequency comparator measures the instantaneous error between the frequency scaled input of a frequency divider (not shown and the linear frequency modulation output of the bandpass filter 122. The output is applied to the voltage tuning input of a microwave or millimeterwave VCO (not shown. In this manner, the instantaneous frequency of the VCO follows the linear frequency modulation of DDS 104. The internal DDS digital calculations and the timing provided by the multiplied clock frequency determine the DDS 104 output. Native non-linearities in the VCO tuning characteristics or those induced by external load conditions or external environment are automatically corrected by the measurements provided in the phase and frequency comparator.

A receiver mixer 140 receives a small fraction of the output of the PLL 126 as the reference input of the mixer 140 in a receiver 158. The mixer 140 subtracts the reference signal provided by the PLL 126 from the signal received by an antenna 150 via a circulator 152. The frequency difference generated by the mixer 140 flows through a high pass filter (HPF) 142, which filters the received analog signal and sends it to an analog to digital (A/D) converter 144. The digital output of the AID converter 144 arrives at an input of the navigation radio unit 32. The navigation radio unit 32 computes Fast Fourier Transforms (FFT) of the sampled data. The resulting frequency bins of the FFT correspond to incremental altitude bins. Altitude frequency bins are evaluated to determine the aircraft height above the ground.

Figure 5B:
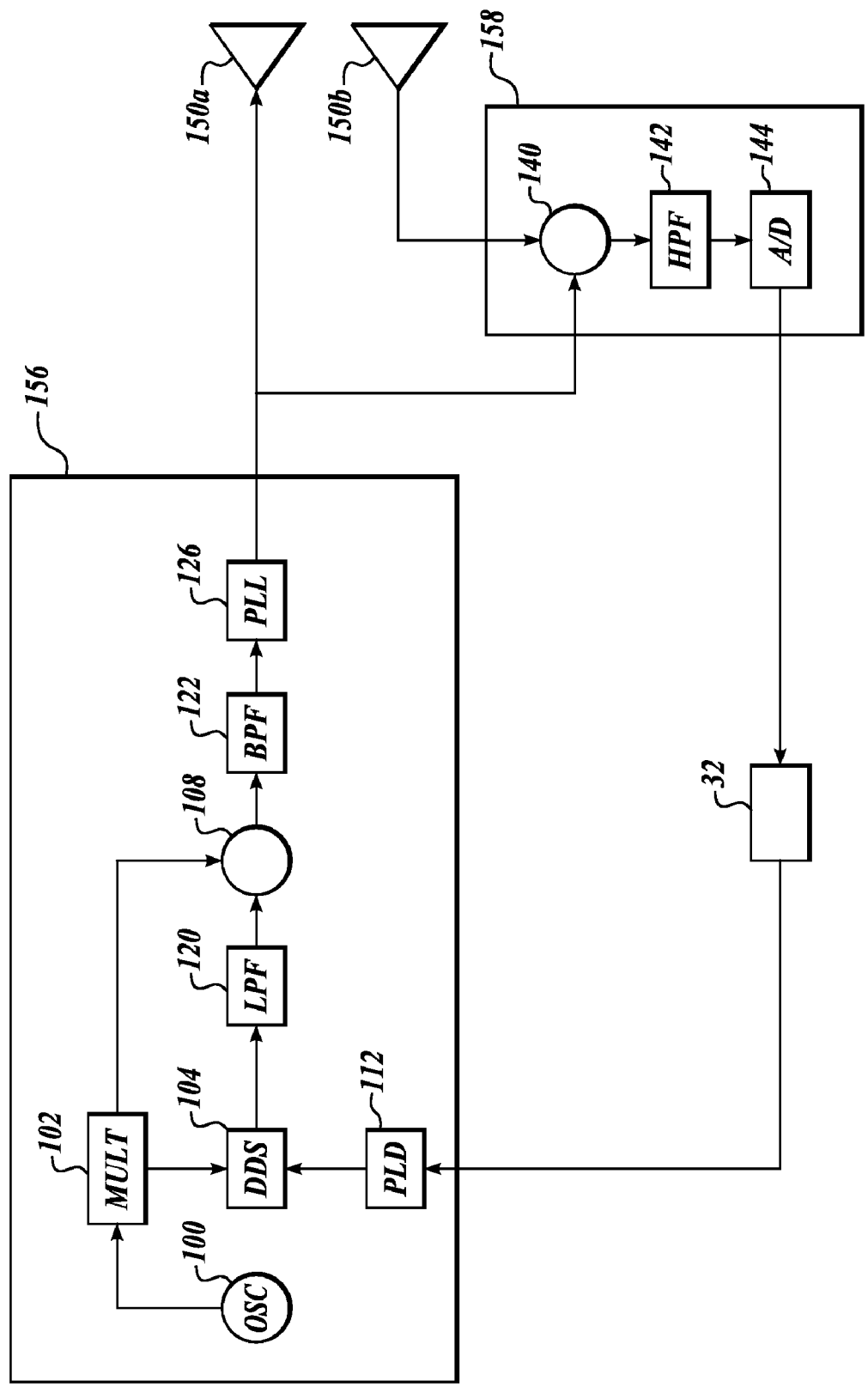
FIG. 5B illustrates detailed electronic components of an alternate radar altimeter formed in accordance with an embodiment of the present invention.

As shown in FIG. 5B, a transmission antenna 150a and a reception antenna 150b replace the single antenna 150 and circulator 152 as shown in FIG. 5A. This dual antenna configuration is useful where low transmitter power levels used in a single antenna system would limit the required maximum altitude range of the altimeter. In this case, the circulator 152 is removed and the required isolation between transmitter and receiver is achieved by separate transmit and receive antennas in a single hermetic package. In this embodiment, the invention continues to incorporate closed-loop digital synthesis of the linear frequency modulation, but measurement of very low altitudes are restricted to those ranges where the adjacent antenna beamwidths continue to overlap. The signal processing portion of the altimeter is located with the navigation system in a standard electronics bay, while the RF and antenna portion are optimally located on the aircraft to provide the most accurate information to the navigation system and flight controls.

In one specific embodiment of the transmitter 56 or 156, the output of the transmitter 56 or 156 is a linear frequency sweep of 200 MHz modulated bandwidth between 4200–4400 MHz. In order to get this desired output, the navigation radio unit 32 instructs the DDS 104 via the PLD 112 to generate a signal having a bandwidth between 82.7–104.9 MHz. The frequency of clock oscillator 100 is 128 MHz and the multiplication factor of frequency multiplier 102 is three. Therefore, the output of the multiplication circuit 102 is 384 MHz and when combined at the mixer 108 produces a signal having a bandwidth between 466.7–488.9 MHz (having a center at 477 MHz) at the output of the BPF 122. The PLL circuit 126 includes a voltage-controlled oscillator (VCO) that can be tuned at least 300 MHz centered about 4300 MHz. A frequency divider divides the VCO generated 4300 MHz signal by a factor of 9 which results in an output frequency range of 466.7 MHz and 488.9 MHz when the tuning range of VCO 90 lies between 4200 MHz and 4400 MHz. Output of the frequency divider is compared to the output of bandpass filter 122 that contains the reference 466.7 to 488.9 MHz linear frequency sweep generated by the DDS 104 and the multiplied frequency output of frequency multiplier 102. Any frequency or phase error between the reference signal and the frequency divided VCO signal is corrected by the error amplifier and filter by tuning the VCO to achieve the correct frequency or phase within the PLL 126.

Figure 1:
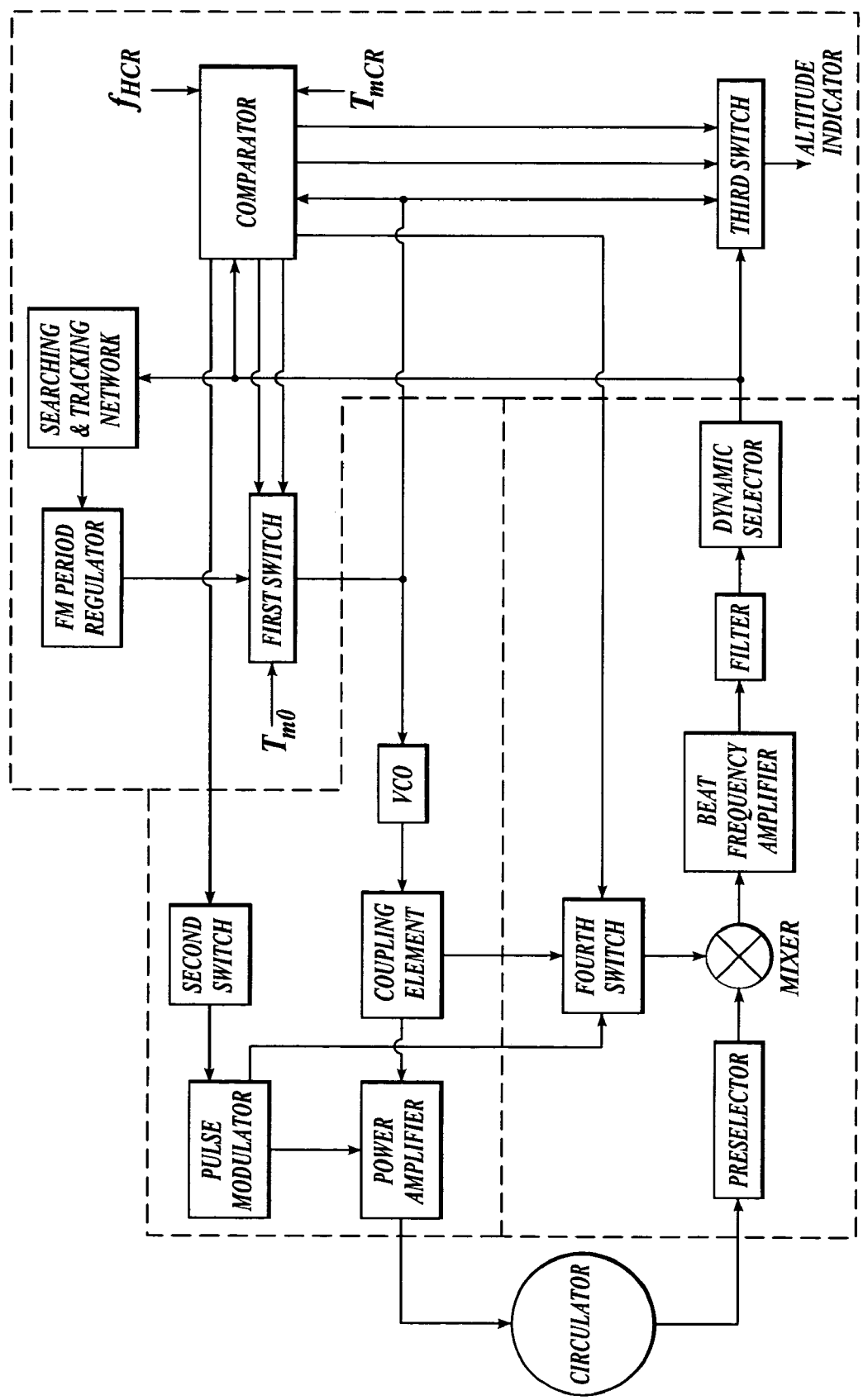
FIG. 1 illustrates a block diagram of a prior art radar-altimeter system.
Figure 2:
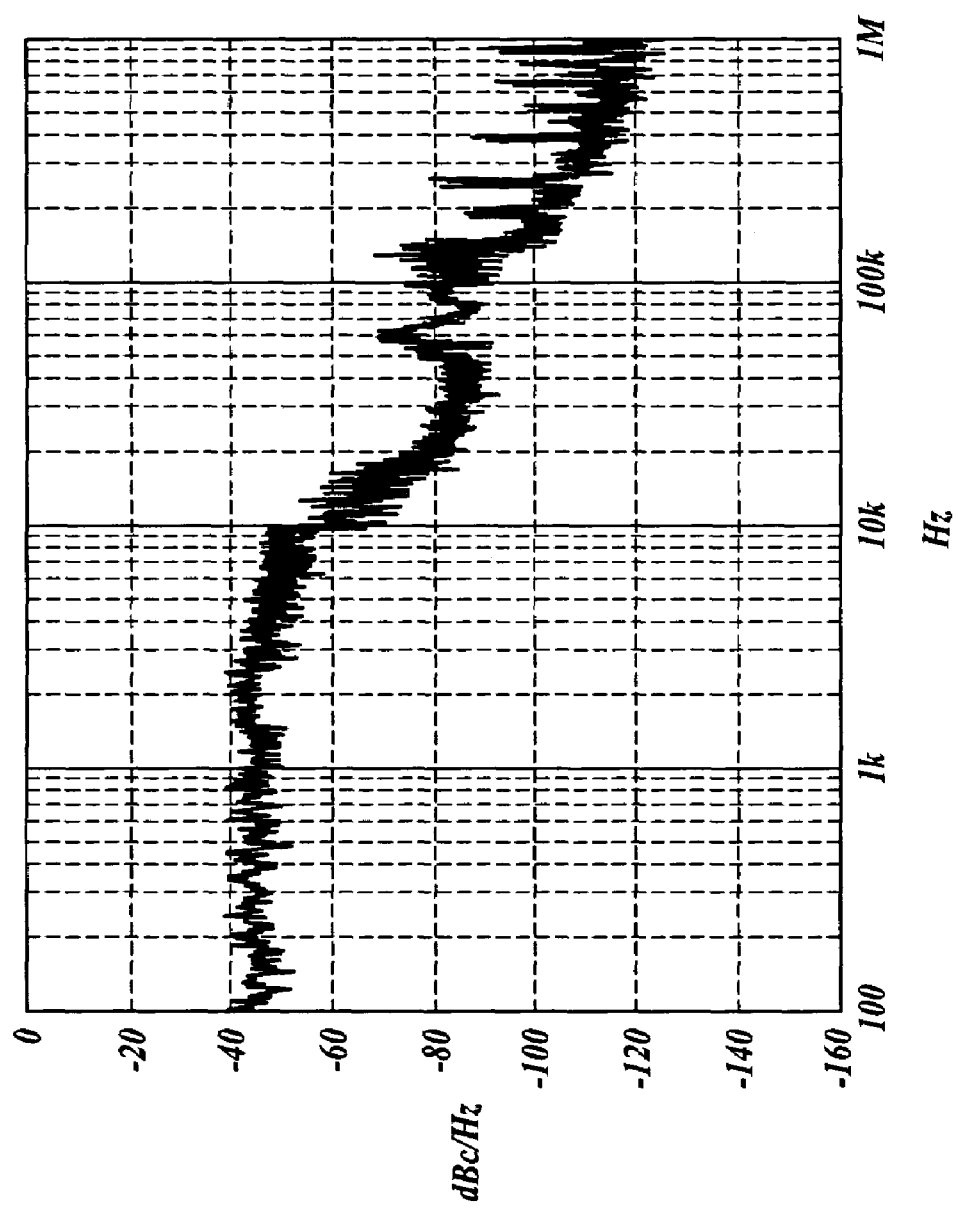
FIG. 2 illustrates phase noise produced by a prior art radar altimeter.
Figure 6:
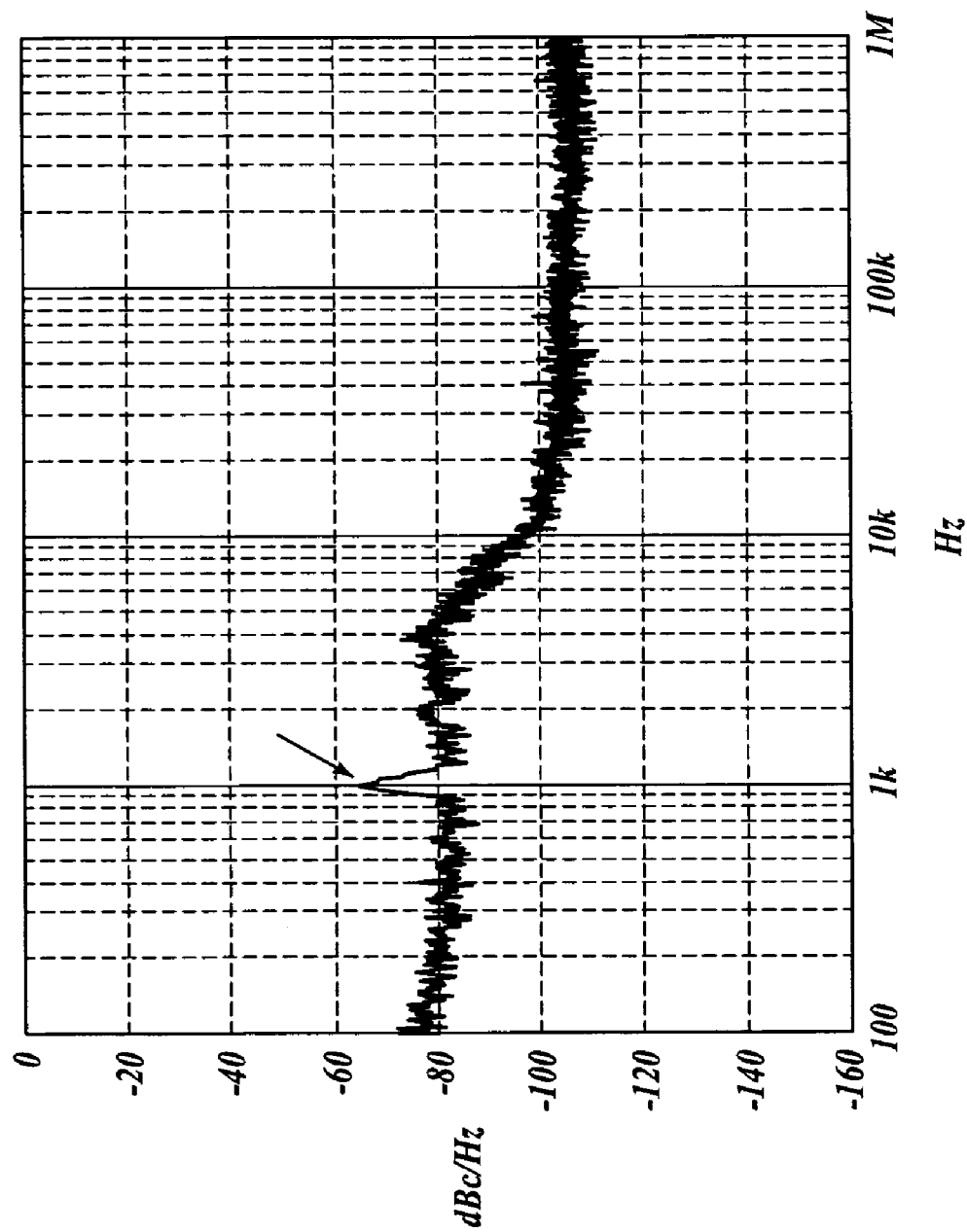
FIG. 6 illustrates example phase noise produced by the radar altimeter formed in accordance with an embodiment of the present invention.

The output radar signal produced by the transmitter 56 or 156 has a more definite defined range than prior art systems, thus providing greater differentiation of the center of the radar signal from side lobes. In addition, the outputted radar signal over time exhibits a more linear relationship between frequency and time due to less distortion. Also, as shown in FIG. 6 the phase noise is much lower than that produced by the prior art system of FIG. 2. The substantially lower phase noise is critical because it is one of the primary reasons a single antenna radar altimeter is possible. Had the phase noise remained as high as encountered by the prior art altimeters, the radar would have been jammed by the excess noise and operation would not be possible. An exceptionally sensitive altimeter results when very low phase noise is combined with a controlled low Voltage Standing Wave Ratio (VSWR) at the antenna connection and exceptionally linear modulation. A single antenna altimeter is not possible without these attributes.

Figure 7:
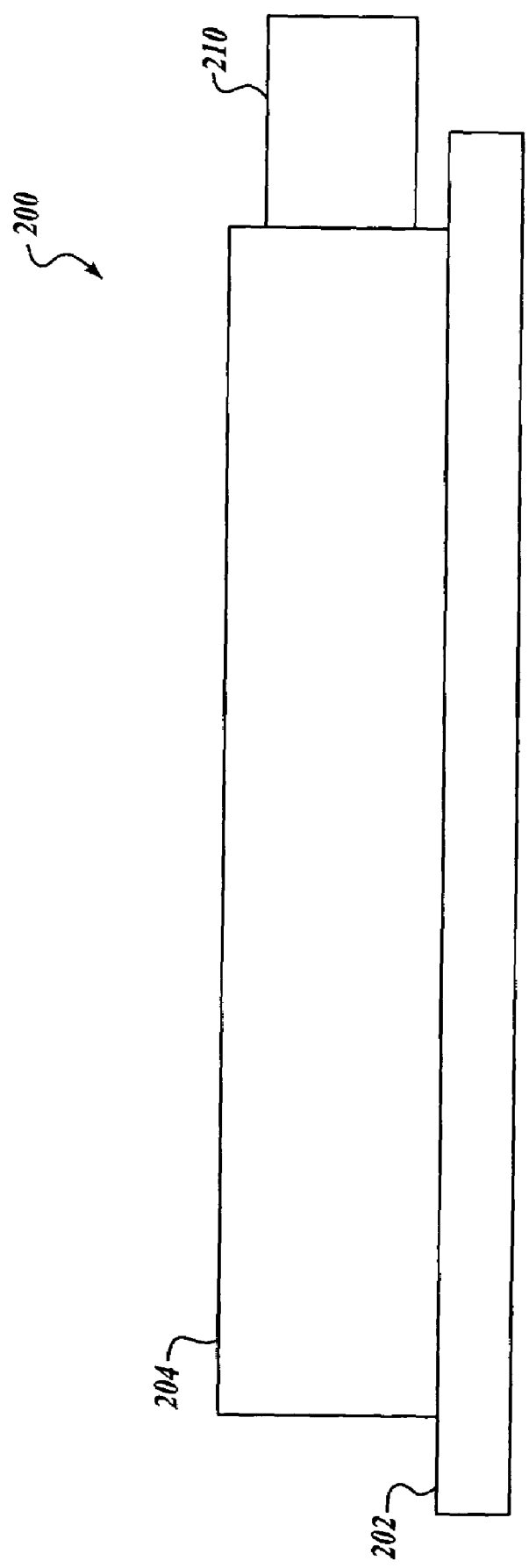
FIG. 7 illustrates a side view of a radar altimeter formed in accordance with an embodiment of the present invention.

FIG. 7 illustrates a side view of a radar altimeter 200 packaged for use in an aircraft. The radar altimeter 200 includes a single micro-strip antenna 202 with a housing 204 attached to a back side of the antenna 202. Included within the housing 204 are the circulator 52 (in a single transmit/receive antenna configuration), the transmitter 56, and the receiver 58. In one embodiment, the housing 204 is a welded cover that is sealed to the antenna 202 to form a hermetically sealed space within the housing 204. Wires extending from the housing 204 pass through a waterproof connector 210, thereby ensuring that the electronics within the housing 204 are protected from the environment.

Because the components of the radar altimeter 200 are attached directly to the antenna 202, a coax cable connecting the circulator 52 to the micro-strip antenna 202 is not necessary. In this embodiment, the micro-strip antenna 202 is connected as closely as possible to a circuit board that includes the circulator 52, the transmitter 56, and the receiver 55. In one embodiment, the distance between the circulator 52 (circuit board) and the micro-strip antenna 202 is approximately 0.1 inch. The present invention exhibits constant modulation quality and signal-to-noise ratio over time, thereby eliminating the need to recalibrate after installation or later. The modulated radar signal produced by the transmitter has a linearity error value of less than 0.05%.

In one embodiment, the circuit board and circuit components are a Silicon Gremanium (SiGe) Monolithic Microwave Integrated Circuit (MMIC). It can be appreciated that other configurations are possible.

If the radar altimeter 34 is not located at the tail of the aircraft, tail strike processing may include other information, such as pitch, or roll, received from other aircraft systems, such as the Flight Management System (FMS) or Flight Control System (FCS).

Figure 8:
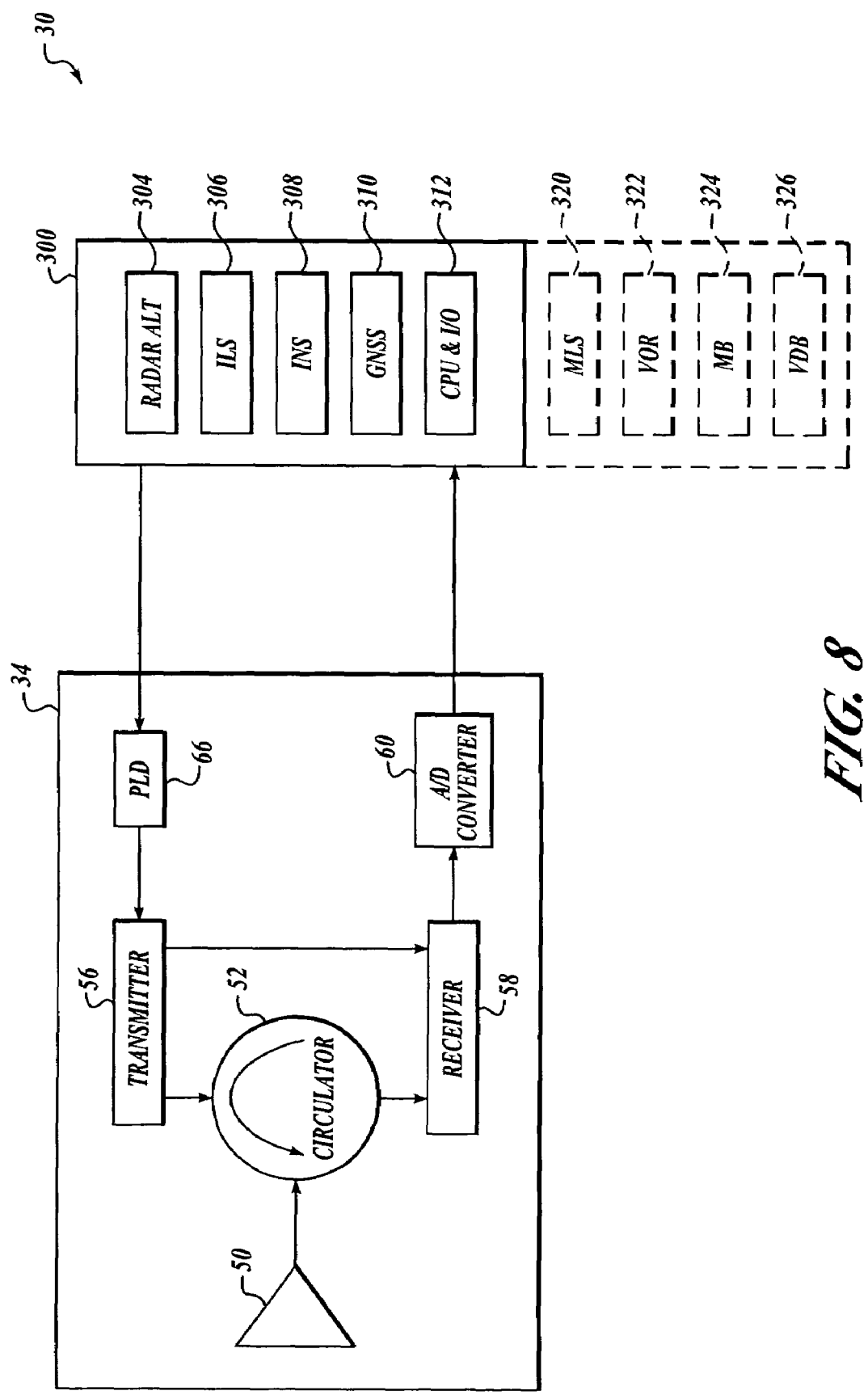
FIG. 8 illustrates a block diagram of a navigation system formed in accordance with an embodiment of the present invention.

FIG. 8 illustrates the single antenna radar altimeter implemented with other navigation radio components into a single electronics bay or chassis 300. The chassis 300 includes multiple circuit boards designated to perform different functions.

The chassis 300 is preferably located in an electronics bay of the aircraft. The chassis 300 includes a plurality of circuit board receiving slots. In one embodiment, the chassis slots receive a first circuit board 306 having an Instrument Landing System (ILS) receiver and associated circuitry, a second circuit board 308 having an Inertial Navigation System (INS) receiver and associated circuitry, a third circuit board 310 having a Global Positioning System (GPS) or Global Navigation Satellite System (GNSS) and associated circuitry, a fourth circuit board 304 having radar altimeter components, and a fifth circuit board 312 having controlling processor and input/output (I/O) circuitry. In another embodiment integrated circuit technologies such as MEMS filters may permit integration of multiple radio receiver functions onto a single circuit board, further reducing weight and cost. The chassis 300 includes a motherboard that provides a common bus system for signal and power distribution between the circuit boards and other aircraft systems. Other power and processing circuit boards may be included in the chassis 300.

A main processing circuit board or the fourth circuit board 304 includes Multi-Mode Radio (MMR) processing circuitry. In one embodiment, the MMR processing circuitry includes a digital signal processor (DSP) with FFT or a Field Programmable Gate Array (FPGA). The fourth circuit board 304 is in signal communication with other components of the chassis 300. The MMR processing circuitry receives serial data produced by the Analog to Digital (A/D) Converter 60 of the radar altimeter 34. The MMR processing circuitry also include an altitude computation processor that receives altitude bin data. The altitude computation processor analyzes distance to ground values. In one embodiment the altitude computation processor generates a tail strike warning based on the analysis. The altitude computation processor determines an altimeter value by determining position of the digital signal.

Because of the data received at the receiver 58 and digitized, light weight wires versus coax cable are all that need to be connected between the radar altimeter 34 and the chassis 300. The type of data digitized by the A/D Converter 60 may be processed to yield different results.

Figure 9:
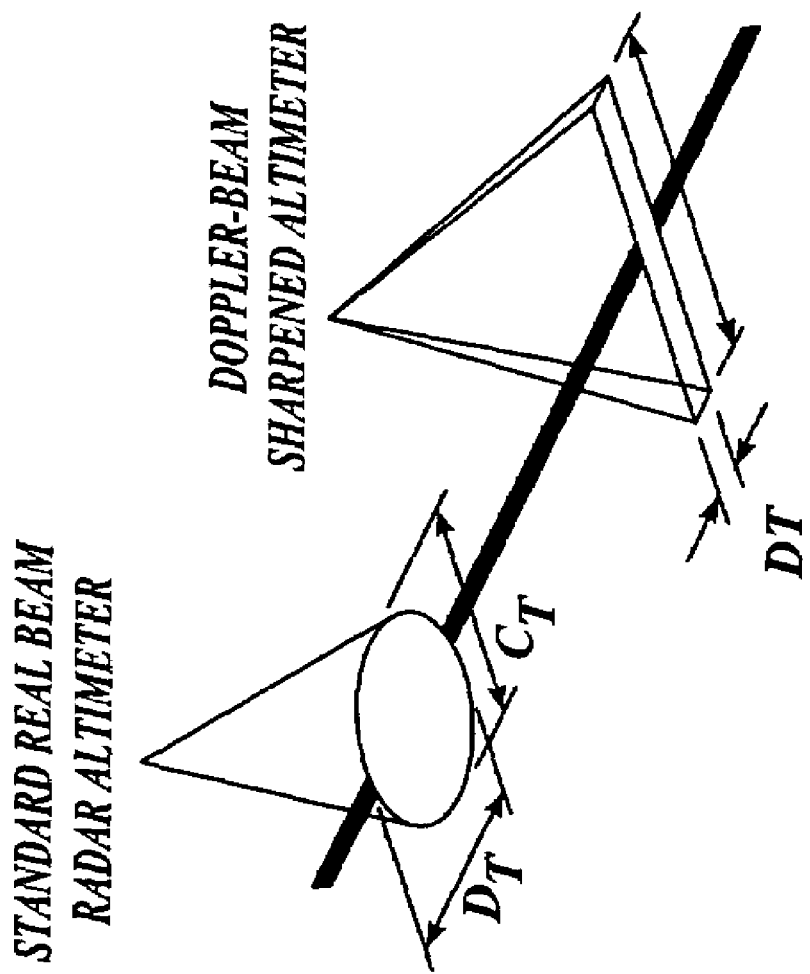
FIG. 9 illustrates data analysis that can be produced by the system shown in FIG. 8.

In one embodiment, Doppler beam sharpening is performed, see FIG. 9, because the transmitter 56 provides phase stability. In other words, the DDS 82 or 104 provides chirp-to-chirp (pulse-to-pulse) modulation that is phase coherent. Doppler beam sharpening can be used to perform Terrain Contour Matching (TERCOM) when compared to an altitude database.

When measured height above ground is compared with a stored altitude reference map, a comparison of location computed by the radar altimeter is made against a position computed by the Inertial sensor and GNSS sensor. For example, when the INS is in a coast situation, the radar altimeter information is combined to correct for any deviations. Thus, the present invention can be used to improve the integrity of various flight scenarios, such as CAT II/III landings.

In alternate embodiments, the chassis 300 includes various other types of receiver circuit boards, such as a Marker Beacon (MB) receiver 324, a VHF (Very High Frequency) Omni-directional Radio (VOR) receiver 322, a Microwave Landing System (MLS) receiver 320, a VDB (VHF Data Broadcast) receiver 326 and associated circuitry. A tail strike altimeter hardware and/or software may also be included within the chassis 300 for providing accurate tail altitude information when an antenna is located at the tail of the aircraft.

While the preferred embodiment of the invention has been illustrated and described, as noted above, many changes can be made without departing from the spirit and scope of the invention. For example, the configuration shown in FIG. 8 is an example of one configuration, however, other configurations may be used without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A navigation system comprising:
   a single antenna radar device comprising:
     a circulator;
     a transmitter in signal communication with the circulator for transmitting a radar signal using closed-loop modulation;
     a receiver in signal communication with the circulator and the transmitter, the receiver configured to receive reflections of the transmitted radar signal; and
     an analog-to-digital converter in signal communication with the receiver for outputting a digital signal of the received reflections;
   a chassis remotely located from the single antenna radar device, the chassis comprising:
     a radar altimeter processing component;
     an instrument landing system (ILS) component;
     an inertial navigation system (INS) component;
     a global positioning system (GPS) receiver component; and
     a controller being in data communication with the radar altimeter processing component, the ILS component, the INS component, and the GPS receiver component; and
     a data communication device coupled to the single antenna radar device and the controller, the data communication device includes at least one of an Ethernet cable or a fiber optics cable.

2. The system of claim 1, wherein at least a portion of each of the components are disposed on one or more circuit boards, wherein the circuit boards are received within the chassis.

3. The system of claim 1, wherein the digital signal of the reflections includes a composite of frequency over time.

4. The system of claim 1, wherein the chassis further comprises one or more of a microwave landing component, a marker beacon component, a VHF data broadcast component, or a VHF omni-directional component.

5. The system of claim 1, wherein the closed-loop modulation is performed by a phase-locked loop circuit as controlled by a direct digital synthesizer.

6. A navigation radio unit being in digital data communication with a radar system, the unit comprising:
   a controller for sending signals to the radar system for transmission and receiving digital signals from the radar system via at least one of an Ethernet cable or a fiber optics cable;

a radar altimeter processing component coupled to the controller;

an instrument landing system (ILS) component;

an inertial navigation system (INS) component; and a global positioning system (GPS) receiver components wherein the received digital signals are digitized radar reflections of a transmitted radar signals generated using closed-loop modulation.

7. The unit of claim 6, further comprising a chassis, wherein at least a portion of each of the components are disposed on circuit boards, wherein the circuit boards are received within the chassis.

8. The unit of claim 6, wherein the received digital signals include a composite of frequency over time of radar reflections.

* * * * *